United States Patent
Nakajima

(10) Patent No.: US 8,042,517 B2
(45) Date of Patent: Oct. 25, 2011

(54) FUEL PROPERTY DETECTOR FOR INTERNAL COMBUSTION ENGINE

(75) Inventor: Toshiya Nakajima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 372 days.

(21) Appl. No.: 12/311,911

(22) PCT Filed: Aug. 6, 2008

(86) PCT No.: PCT/JP2008/064108
§ 371 (c)(1),
(2), (4) Date: Apr. 17, 2009

(87) PCT Pub. No.: WO2009/022595
PCT Pub. Date: Feb. 19, 2009

(65) Prior Publication Data
US 2010/0012089 A1  Jan. 21, 2010

(30) Foreign Application Priority Data
Aug. 13, 2007  (JP) .................. 2007-210834

(51) Int. Cl.
*F02P 5/04* (2006.01)
*F02P 5/00* (2006.01)

(52) U.S. Cl. .................. 123/406.41; 123/575

(58) Field of Classification Search ............. 123/406.41, 123/406.42, 435, 575, 304; 701/103; 73/114.16, 73/114.63, 35.02
See application file for complete search history.

(56) References Cited

U.S. PATENT DOCUMENTS

| | | | |
|---|---|---|---|
| 5,050,555 A * | 9/1991 | Mitsumoto | 123/406.31 |
| 2007/0012289 A1 | 1/2007 | Yamaguchi et al. | |
| 2007/0044759 A1 | 3/2007 | Yamaguchi et al. | |
| 2007/0055437 A1 | 3/2007 | Yamaguchi et al. | |
| 2007/0079647 A1 | 4/2007 | Aoyama | |

FOREIGN PATENT DOCUMENTS

| | | |
|---|---|---|
| EP | 1 074 839 A1 | 2/2001 |
| EP | 1 760 299 A1 | 3/2007 |
| JP | A-2005-344557 | 12/2005 |
| JP | A-2006-016994 | 1/2006 |
| JP | A-2007-046592 | 2/2007 |
| JP | A-2007-064157 | 3/2007 |

OTHER PUBLICATIONS

International Report on Patentability issued in International Application No. PCT/JP2008/064108, on Mar. 9, 2010.
European Search Report issued in EP 08827261.2, dated May 3, 2011.

* cited by examiner

*Primary Examiner* — Mahmoud Gimie
(74) *Attorney, Agent, or Firm* — Oliff & Berridge, PLC

(57) ABSTRACT

A fuel property detector for an internal combustion engine determines a cetane number with high accuracy even when a high-cetane fuel is used.
The fuel property detector includes a cylinder pressure detection device; ignition delay time calculating device for calculating ignition delay time in accordance with the cylinder pressure; a high-cetane fuel judgment device for judging based on the ignition delay time whether the cetane number of an employed fuel is high; an ignition delay time extension device that increases the ignition delay time by correcting a control parameter for the internal combustion engine; an ignition delay time recalculation device for recalculating the ignition delay time based on cylinder pressure after the ignition delay time is increased by the ignition delay time extension device; and a cetane number calculation device for calculating the cetane number of the employed fuel based on the recalculated ignition delay time.

8 Claims, 5 Drawing Sheets

US 8,042,517 B2

FUEL PROPERTY DETECTOR FOR INTERNAL COMBUSTION ENGINE

TECHNICAL FIELD

Figure 1:
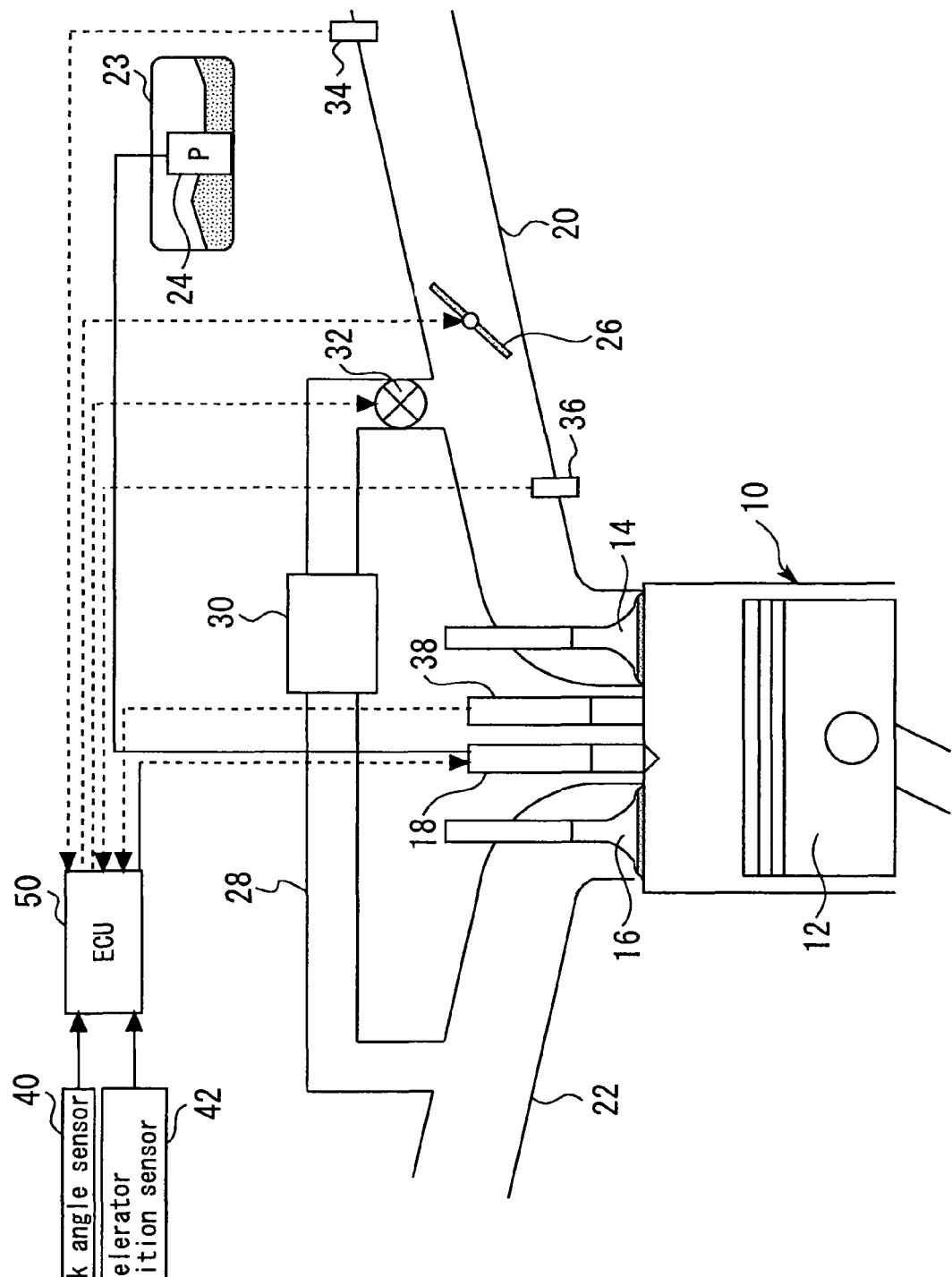

The present invention relates to a fuel property detector for an internal combustion engine.

BACKGROUND ART

In recent years, it has been increasingly demanded from the viewpoint, for instance, of petroleum depletion and other global environmental issues, that an alternative fuel be used with internal combustion engines. Therefore, there is a pressing need to develop an internal combustion engine that operates on a wide variety of fuels. To permit an internal combustion engine to operate on a wide variety of fuels, it is preferred that the cetane number of a fuel be accurately detected in a vehicle. The reason is that combustion can be properly controlled in accordance with the type of an employed fuel when engine control is exercised in accordance with the fuel's cetane number.

A prior art device disclosed, for instance, in JP-A-2007-64157 detects actual ignition timing from a cylinder pressure detected by a cylinder pressure sensor, calculates an ignition delay correction amount so that the actual ignition timing agrees with target ignition timing, and estimates a cetane number from the ignition delay correction amount.

Patent Document 1: JP-A-2007-64157
Patent Document 2: JP-A-2007-46592
Patent Document 3: JP-A-2006-16994
Patent Document 4: JP-A-2005-344557

DISCLOSURE OF THE INVENTION

Problem to be Solved by the Invention

The higher the cetane number of a fuel, the shorter the ignition delay time (the time interval between the instant at which the fuel is injected into a combustion chamber and the instant at which ignition occurs). The lower the cetane number of a fuel, the longer the ignition delay time. Therefore, the fuel's cetane number can be determined by detecting actual ignition delay time during an engine operation in the same manner as the aforementioned prior art.

However, the relationship between the cetane number and ignition delay time is such that the gradient (change ratio) of the cetane number with respect to a change in ignition delay increases with an increase in the cetane number. Therefore, if, for instance, a GTL (Gas To Liquid) fuel or other high-cetane alternative fuel is used, the cetane number changes greatly with a slight change in ignition delay. Consequently, when a high-cetane fuel is used, it is difficult to determine the cetane number with high accuracy.

The present invention has been made to solve the above problem. An object of the present invention is to provide a fuel property detector for use with internal combustion engines that is capable of accurately determining the cetane number even when a high-cetane fuel is used.

Means for Solving the Problem

First aspect of the present invention is a fuel property detector for an internal combustion engine, comprising:
cylinder pressure detection means for detecting cylinder pressure in an internal combustion engine;
ignition delay time calculation means for calculating ignition delay time in accordance with the cylinder pressure;
high-cetane fuel judgment means for judging in accordance with the calculated ignition delay time whether the cetane number of an employed fuel is high;
ignition delay time extension means which, when the cetane number of the employed fuel is judged to be high, increases the ignition delay time by correcting a control parameter for the internal combustion engine;
ignition delay time recalculation means for recalculating the ignition delay time in accordance with the cylinder pressure after the ignition delay time is increased by the ignition delay time extension means; and
cetane number calculation means for calculating the cetane number of the employed fuel in accordance with the ignition delay time calculated by the ignition delay time recalculation means.

Second aspect of the present invention is the fuel property detector according to the first aspect, wherein the ignition delay time extension means corrects the control parameter so as to create operating conditions where the gradient of a cetane number with respect to the ignition delay time is gentler than a predetermined gradient.

Third aspect of the present invention is the fuel property detector according to the first or the second aspect, further comprising:
low-cetane fuel judgment means for judging in accordance with the ignition delay time calculated by the ignition delay time calculation means whether the cetane number of the employed fuel is low; and
ignition delay time reduction means which, when the cetane number of the employed fuel is judged to be low, decreases the ignition delay time by correcting a control parameter for the internal combustion engine;
wherein the ignition delay time recalculation means calculates the ignition delay time in accordance with the cylinder pressure after the ignition delay time is decreased by the ignition delay time reduction means.

Fourth aspect of the present invention is the fuel property detector according to the third aspect, wherein the ignition delay time reduction means corrects the control parameter so that the combustion stability of the internal combustion engine is not lower than a reference value.

Advantages of the Invention

When a detected ignition delay time implies that an employed fuel is a high-cetane fuel, the first aspect of the present invention can correct a control parameter for an internal combustion engine so as to increase the ignition delay time, detect the ignition delay time anew, and calculate the cetane number of the employed fuel in accordance with the newly detected ignition delay time. When a high-cetane fuel is used, a slight change in the ignition delay time would greatly affect the cetane number; therefore, it is usually difficult to achieve cetane number detection with high accuracy. In such a situation, the first aspect of the present invention makes it possible to correct the control parameter for an internal combustion engine in such a manner as to decrease the gradient of the cetane number with respect to the ignition delay time, and then detect the cetane number. Consequently, the cetane number can be accurately detected even when a high-cetane fuel is used.

When a high-cetane fuel is used, the second aspect of the present invention can correct the control parameter for an internal combustion engine so as to create operating conditions where the gradient of a cetane number with respect to the ignition delay time is gentler than a predetermined gradient. Consequently, the cetane number of a high-cetane fuel can be detected with increased accuracy.

When a detected ignition delay time implies that an employed fuel is a low-cetane fuel, the third aspect of the present invention can correct the control parameter for an internal combustion engine so as to decrease the ignition delay time, detect the ignition delay time anew, and calculate the cetane number of the employed fuel in accordance with the newly detected ignition delay time. When a low-cetane fuel is used, the ignition delay time is long. This increases the likelihood of combustion instability and misfiring, thereby making it difficult to achieve normal ignition. This also makes it difficult to properly detect the ignition delay time. As a result, it is extremely difficult to detect the cetane number with high accuracy. In such a situation, the third aspect of the present invention can detect the cetane number after shortening the ignition delay time to create operating conditions where stable combustion occurs. Consequently, the cetane number can be accurately detected even when a low-cetane fuel is used.

When a low-cetane fuel is used, the fourth aspect of the present invention can correct the control parameter for an internal combustion engine so that the combustion stability of the internal combustion engine is not lower than a reference value. Therefore, the ignition delay time can be accurately detected during stable combustion even when a low-cetane fuel is used. This makes it possible to detect the cetane number with high accuracy.

BEST MODE FOR CARRYING OUT THE INVENTION

First Embodiment

[Description of System Configuration]

FIG. 1 is a diagram illustrating the configuration of a system according to a first embodiment of the present invention. As shown in FIG. 1, the system according to the first embodiment includes a diesel engine (compression-ignition internal combustion engine) 10 that is to be mounted, for instance, in a vehicle. The present invention does not specifically define the number of cylinders in the diesel engine 10 or the arrangement of the cylinders. FIG. 1 shows a cross section of one cylinder in the diesel engine 10.

Each cylinder in the diesel engine 10 is provided with a piston 12, an intake valve 14, an exhaust valve 16, and a fuel injector 18. The fuel injector 18 is capable of directly injecting fuel into the cylinder. The intake valve 14 communicates with an intake path 20, whereas the exhaust valve 16 communicates with an exhaust path 22.

Fuel is supplied from a fuel tank 23 to the diesel engine 10. The fuel is pressurized by a fuel pump 24 and supplied to the fuel injector 18.

The intake path 20 is provided with a throttle valve 26. An EGR path 28 is positioned between the intake path 20 and the exhaust path 22 to provide EGR (Exhaust Gas Recirculation) so that part of a gas in the exhaust path 22 flows back to the intake path 20. An EGR cooler 30 is installed in the middle of the EGR path 28 to cool an exhaust gas (EGR gas) that passes through the EGR path 28. An EGR valve 32 is installed downstream of the EGR cooler 30 to control the amount of EGR.

An air flow sensor 34 is installed in the intake path 20 and positioned upstream of the throttle valve 26 to detect the amount of intake air. An intake pressure sensor 36 is installed in the intake path 20 and positioned downstream of the throttle valve 26 to detect an intake pressure.

The system according to the present embodiment also includes a cylinder pressure sensor 38 to detect the pressure in a cylinder. The cylinder pressure sensor 38 needs to be installed in at least one cylinder.

Further, the system according to the present embodiment includes a crank angle sensor 40 for detecting the rotation angle of a crankshaft in the diesel engine 10, an accelerator position sensor 42 for detecting the position of an accelerator pedal in the vehicle, and an ECU (Electronic Control Unit) 50. The ECU 50 is connected to various actuators such as the aforementioned fuel injector 18, throttle valve 26, and EGR valve 32 and various sensors such as the air flow sensor 34, intake pressure sensor 36, cylinder pressure sensor 38, crank angle sensor 40, and accelerator position sensor 42.

[Features of First Embodiment]

There is a certain delay between the instant at which the fuel injector 18 begins to inject fuel and the instant at which ignition occurs. The length of such delay is referred to as ignition delay time. Cylinder pressure rapidly rises upon ignition. Therefore, actual ignition can be detected by detecting the cylinder pressure. The system according to the present embodiment is capable of calculating the ignition delay time in accordance with the cylinder pressure detected by the cylinder pressure sensor 38.

While the operating conditions remain unchanged, the ignition delay time is determined in accordance with the cetane number of fuel. Therefore, when the relationship between the ignition delay time and the cetane number is used, the cetane number of fuel can be calculated in accordance with the ignition delay time determined from the cylinder pressure.

Figure 2:
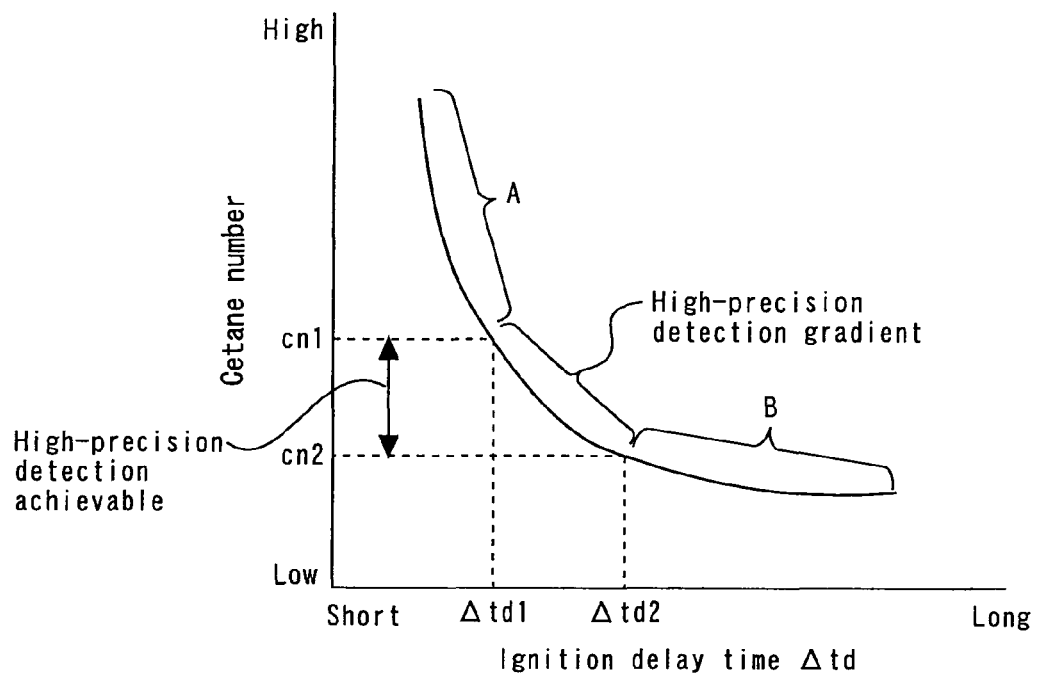

FIG. 2 shows the relationship between the ignition delay time and cetane number in a predefined standard state. The higher the cetane number, the shorter the ignition delay time. The lower the cetane number, the longer the ignition delay time. However, in this instance, the gradient (change ratio) of the cetane number with respect to a change in the ignition delay time is variable. More specifically, the gradient of the cetane number with respect to the ignition delay time is steep when the ignition delay time is short, and the gradient of the cetane number with respect to the ignition delay time is gentle when the ignition delay time is long, as shown in FIG. 2.

Figure 3:
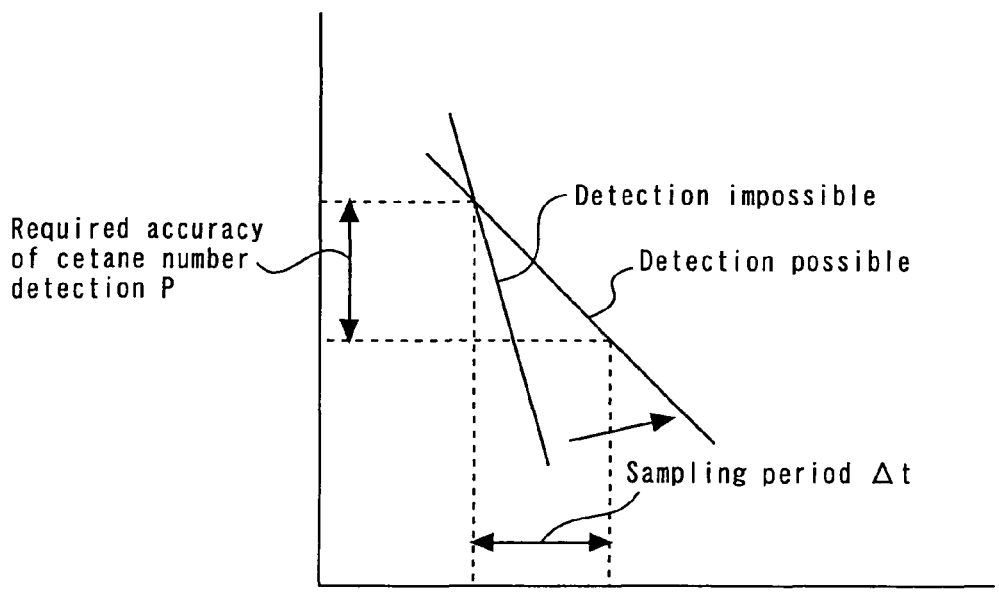

If the gradient of the cetane number with respect to the ignition delay time is excessively steep, it is difficult to determine the cetane number with high accuracy for the reason described below. FIG. 3 illustrates the upper-limit gradient of the cetane number that can provide required detection accuracy. As the cylinder pressure sensor 38 has its own sampling period $\Delta t$ (e.g., approximately 0.066 ms), the accuracy of ignition delay time detection is determined by the sampling period $\Delta t$. If the required accuracy of cetane number detection is p and a cetane number change beyond the required accuracy p is encountered during the sampling period $\Delta t$, which corresponds to the accuracy of ignition delay time detection, the accuracy of cetane number detection exceeds the required accuracy p. Therefore, as shown in FIG. 3, the required accuracy p cannot be met if the gradient of the cetane number with respect to the ignition delay time is steeper than a gradient that is determined by the sampling period $\Delta t$ of the cylinder pressure sensor 38 and the required accuracy p.

In view of the above circumstance, therefore, to determine the cetane number with high accuracy, the gradient of the cetane number with respect to the ignition delay time needs to be gentler than an upper-limit value. FIG. 2 indicates that cetane number detection cannot be achieved with high accuracy because the gradient of the cetane number with respect to the ignition delay time is steeper than the upper-limit value in a region (region A) where the ignition delay time is shorter than $\Delta td1$. Consequently, cetane number detection cannot be accomplished with high accuracy when the cetane number of an employed fuel is higher than cn1 as indicated in FIG. 2.

Meanwhile, if the cetane number of the employed fuel is lower than cn2 as indicated in FIG. 2, the gradient of the cetane number with respect to the ignition delay time is extremely gentle. Therefore, the ignition delay time considerably increases even when the cetane number is slightly decreased. In the associated region (region B in FIG. 2), combustion instability and misfiring are likely to occur, thereby making it difficult to achieve normal ignition. This also makes it difficult to properly detect the ignition delay time. As a result, it is extremely difficult to detect the cetane number with high accuracy.

To determine the cetane number with high accuracy, therefore, the gradient of the cetane number with respect to the ignition delay time needs to be within a predetermined range (hereinafter referred to as the "high-precision detection gradient"). In the standard state shown in FIG. 2, the range of high-precision detection gradient, that is, the range over which the cetane number can be detected with high accuracy, is limited between ignition delay time $\Delta td1$ and ignition delay time $\Delta td2$ and between a cetane number of cn2 and a cetane number of cn1.

Meanwhile, some control parameters for the diesel engine 10 affect the ignition delay time. For example, a decrease in the intake air amount increases the ignition delay time, whereas an increase in the intake air amount decreases the ignition delay time.

Figure 4:
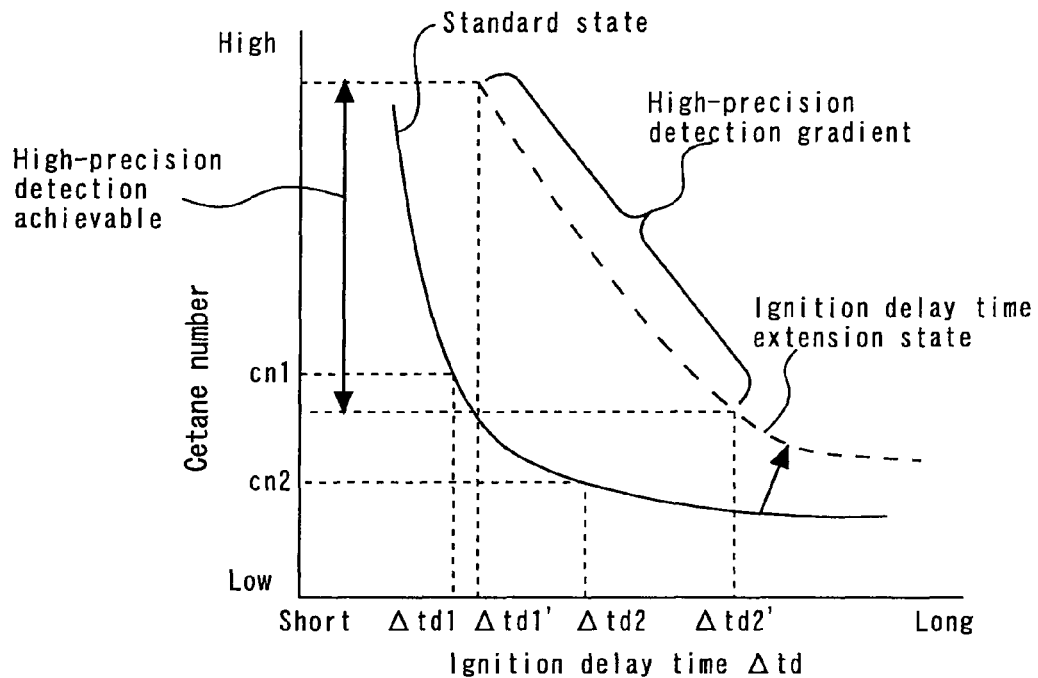

A broken line in FIG. 4 shows the relationship between the ignition delay time and the cetane number that prevails in an ignition delay time extension state where the control parameter for the diesel engine 10 are corrected to make the ignition delay time longer than in the standard state. When the ignition delay time is longer than in the standard state, a graph representing the relationship between the ignition delay time and the cetane number changes its shape. This also changes the range of the high-precision detection gradient. More specifically, in the ignition delay time extension state, the range shown in FIG. 4 represents the high-precision detection gradient. Thus, the range over which the cetane number can be detected with high accuracy is such that the ignition delay time is changed to the range between $\Delta td1'$ and $\Delta td2'$ as indicated in FIG. 4. Consequently, cetane number detection can be achieved with high accuracy even when the cetane number of the employed fuel is not lower than cn1.

When a high-cetane fuel is used, therefore, the present embodiment detects the cetane number after correcting the control parameter for the diesel engine 10 to make the ignition delay time longer than in the standard state. Consequently, the cetane number can be detected with high accuracy even when the employed fuel has such a high cetane number that high-precision cetane number detection cannot readily be achieved in the standard state.

Figure 5:
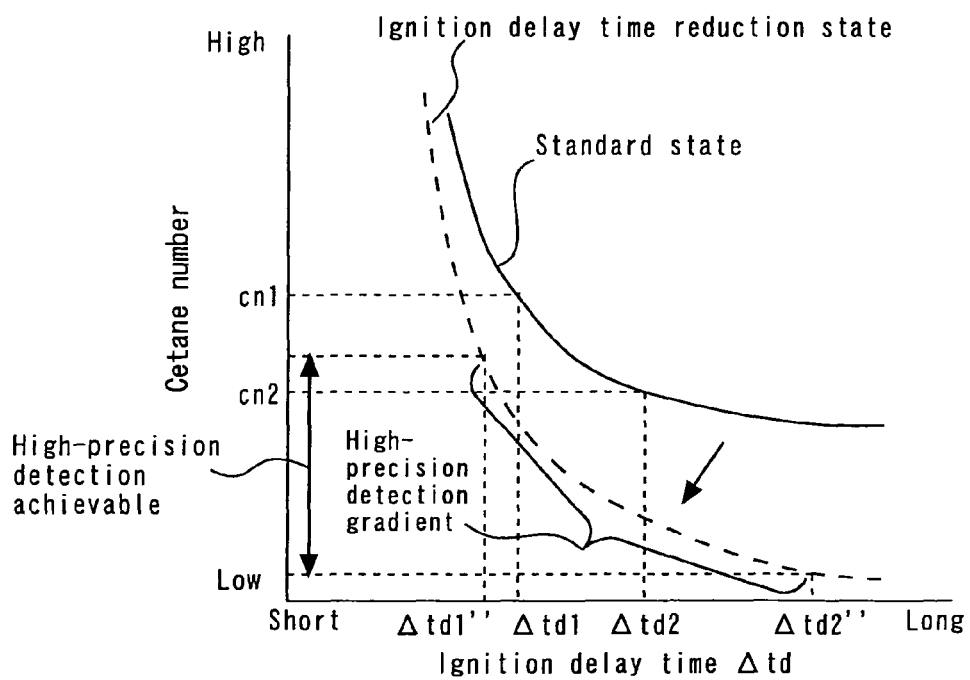

Meanwhile, a broken line in FIG. 5 shows the relationship between the ignition delay time and the cetane number that prevails in an ignition delay time reduction state where the control parameter for the diesel engine 10 are corrected to make the ignition delay time shorter than in the standard state. When the ignition delay time is shorter than in the standard state, a graph representing the relationship between the ignition delay time and the cetane number changes its shape. This also changes the range of the high-precision detection gradient. More specifically, in the ignition delay time reduction state, the range shown in FIG. 5 represents the high-precision detection gradient. Thus, the range over which the cetane number can be detected with high accuracy is such that the ignition delay time is changed to the range between $\Delta td1''$ and $\Delta td2''$ as indicated in FIG. 5. Consequently, cetane number detection can be achieved with high accuracy even when the cetane number of the employed fuel is not higher than cn2.

When a low-cetane fuel is used, therefore, the present embodiment detects the cetane number after correcting the control parameter for the diesel engine 10 to make the ignition delay time shorter than in the standard state. Consequently, the cetane number can be detected with high accuracy even when the employed fuel has such a low cetane number that high-precision cetane number detection cannot readily be achieved in the standard state.

[Details of Process Performed by First Embodiment]

Figure 6:
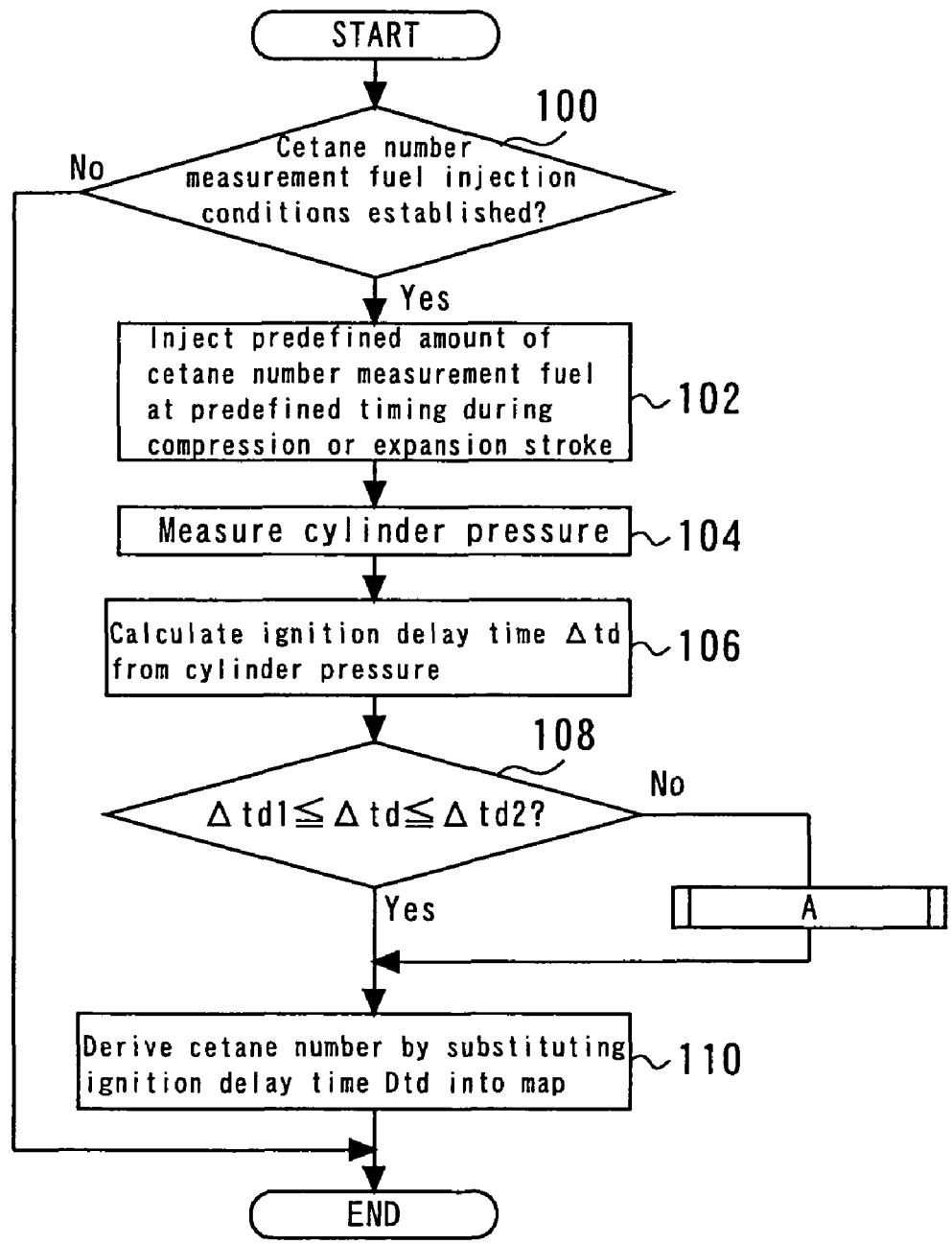
Figure 7:
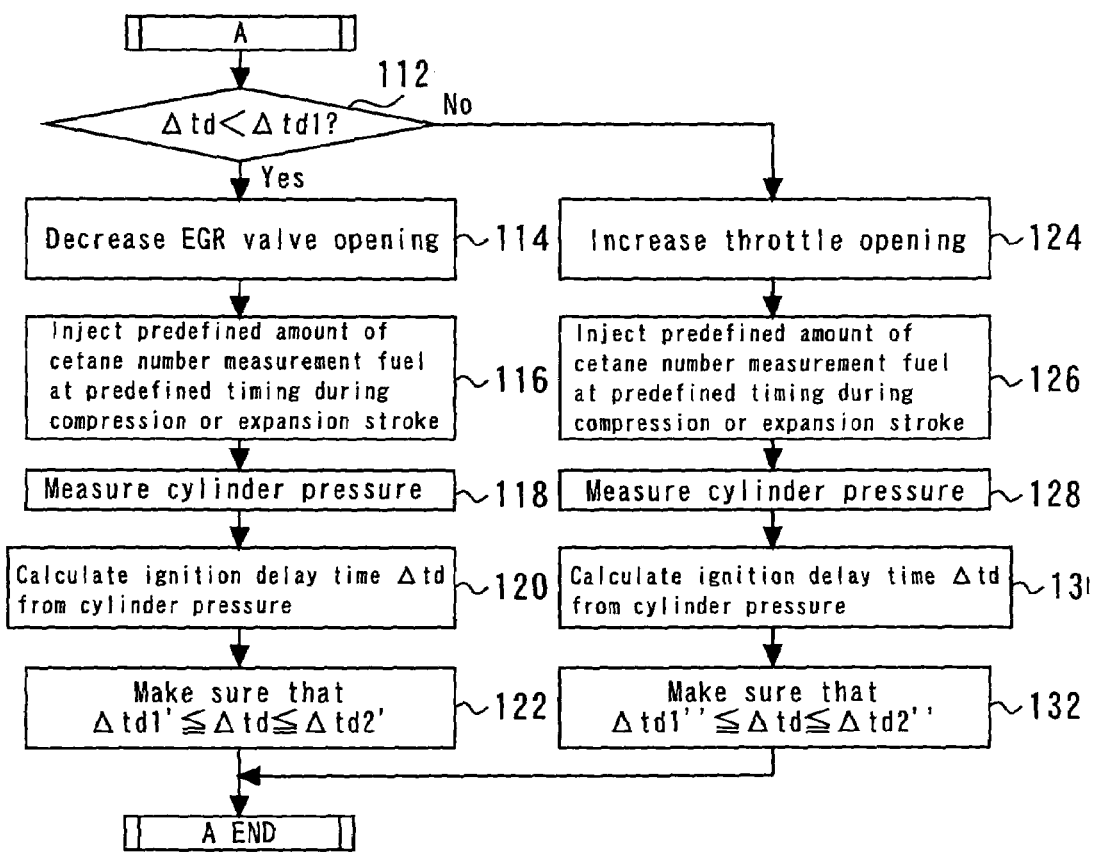

FIGS. 6 and 7 are flowcharts illustrating a routine that the ECU 50 executes to implement the functionality described above.

First of all, the routine shown in FIG. 6 performs step 100 to judge whether predefined cetane number measurement fuel injection conditions are established. To achieve cetane number detection with increased accuracy, the present embodiment detects the cetane number when the following cetane number measurement fuel injection conditions are established:

(1) An accelerator-off state prevails.
(2) The intake air amount is not smaller than a predefined value Ga*.
(3) The engine speed is within a predefined range (e.g., not lower than 1400 rpm but lower than 3000 rpm).

If the judgment result obtained in step 100 indicates that conditions (1) to (3) are all met, the routine concludes that the cetane number measurement fuel injection conditions are established. As condition (1) is imposed, the present embodiment can detect the cetane number when the diesel engine 10 is in a fuel cut state for deceleration. This increases the accuracy of detection because detection can be achieved under conditions where limited disturbance occurs. As for condition (2), an intake air amount that permits various fuels available in the market to burn is predefined, for instance, by an experiment. Condition (3) is imposed so as to detect the cetane number before the engine speed decreases to an idle speed, that is, before the start of fuel injection for idling.

If the judgment result obtained in step 100 does not indicate that the cetane number measurement fuel injection conditions are met, the current execution of the routine comes to an immediate end. If, on the other hand, the obtained judgment result indicates that the cetane number measurement fuel injection conditions are met, the routine proceeds to step 102 and causes the fuel injector 18 to provide cetane number measurement fuel injection. The amount of cetane number measurement fuel injection is predefined so that the amount of torque change is within an allowable range and does not cause a driver to feel uncomfortable. Further, cetane number measurement fuel injection is provided at predefined timing during a compression stroke or expansion stroke. The timing is predefined, for instance, by an experiment so as to minimize the amount of torque increase during the combustion of cetane number measurement fuel.

Next, the routine performs step 104 so that the cylinder pressure sensor 38 detects a cylinder pressure (cylinder pressure history) in a cylinder in which cetane number measurement fuel injection is provided. The routine then performs step 106 to calculate the ignition delay time $\Delta td$ in accordance with the detected cylinder pressure. A method of calculating the ignition delay time Δtd from cylinder pressure will not be described here because various publicly known methods, such as the one disclosed in JP-A-2005-344557, can be used.

Next, the routine performs step 108 to judge whether the ignition delay time Δtd calculated in step 106 is within the range over which the cetane number can be detected with high accuracy, that is, between Δtd1 and Δtd2 (judge whether Δtd1≦Δtd≦Δtd2). The ECU 50 according to the present embodiment stores intake-air-amount-specific maps representing the relationship between the ignition delay time and the cetane number as indicated in FIG. 2 (these maps are hereinafter referred to as the "cetane number derivation maps"). Each cetane number derivation map includes a lower-limit value Δtd1 and an upper-limit value Δtd2, which are predetermined, for instance, by an experiment to define the ignition delay time that permits high-precision cetane number detection. In step 108, the cetane number derivation maps are checked to retrieve a cetane number derivation map that is associated with an intake air amount calculated in accordance with signals from the air flow sensor 34 and intake pressure sensor 36. Further, the values Δtd1 and Δtd2 in the retrieved cetane number derivation map are used to form the above judgment.

If the judgment result obtained in step 108 indicates that Δtd1≦Δtd≦Δtd2, it means that the gradient of the cetane number with respect to the ignition delay time Δtd is within the range of high-precision detection gradient. Consequently, it can be concluded that cetane number detection can be achieved with high accuracy. In this instance, the routine performs step 110 to derive a cetane number by substituting the ignition delay time Δtd calculated in step 106 into the cetane number derivation map.

If, on the other hand, the judgment result obtained in step 108 does not indicate that Δtd1≦Δtd≦Δtd2, it can be concluded that it is difficult to achieve cetane number detection with high accuracy. In this instance, the routine proceeds to step 112, which is shown in FIG. 7, and judges whether the ignition delay time Δtd calculated in step 106 is shorter than the above-mentioned lower-limit value Δtd1 (whether Δtd<Δtd1).

If the judgment result obtained in step 112 indicates that the ignition delay time Δtd is shorter than the lower-limit value Δtd1, the routine proceeds to step 114 and performs a process for correcting the control parameter for the diesel engine 10 (an intake air amount reduction process in the present embodiment). In the diesel engine 10 placed in an accelerator-off state, the opening of the throttle valve 26 is usually decreased with the opening of the EGR valve 32 increased. In this state, the greater part of the intake air flowing into a cylinder is an EGR gas that has flowed back from the exhaust path 22 through the EGR path 28. Therefore, the intake air amount can be reduced by decreasing the opening of the EGR valve 32. Consequently, step 114 is performed, more specifically, to decrease the opening of the EGR valve 32.

After completion of step 114, the routine performs step 116 to provide cetane number measurement fuel injection. The process performed in step 116 is the same as the process performed in step 102. Next, the routine performs step 118 so that the cylinder pressure sensor 38 detects the cylinder pressure (cylinder pressure history) in a cylinder into which cetane number measurement fuel is injected. As the intake air amount is decreased by the process performed in step 114, the cylinder pressure detected in step 118 is lower than the cylinder pressure detected in step 104.

Next, the routine performs step 120 to calculate the ignition delay time Δtd from the cylinder pressure detected in step 118 by using the same method as in step 106. The ignition delay time Δtd calculated in step 120 is longer than the ignition delay time Δtd calculated in step 106.

Next, the routine performs step 122 to make sure that the ignition delay time Δtd calculated in step 120 is between the upper-limit value Δtd1' and lower-limit value Δtd2' of the range over which the cetane number can be detected with high accuracy (Δtd1'≦Δtd≦Δtd2'). The upper-limit value Δtd1' and lower-limit value Δtd2' can be acquired by referencing a cetane number derivation map that is associated with an intake air amount obtained upon decremental correction (see FIG. 4).

Upon completion of step 122, a subroutine shown in FIG. 7 terminates, causing the routine to perform step 110, which is shown in FIG. 6. More specifically, step 110 is performed to derive a cetane number by substituting the ignition delay time Δtd calculated in step 120 into the cetane number derivation map that is associated with the intake air amount obtained upon decremental correction. Here, the cetane number can be determined with high accuracy because the ignition delay time Δtd is between the upper-limit value Δtd1' and lower-limit value Δtd2' of the range over which the gradient of the cetane number permits high-precision detection.

If, on the other hand, the judgment result obtained in step 112, which is shown in FIG. 7, does not indicate that the ignition delay time Δtd calculated in step 106 is shorter than the lower-limit value Δtd1 determined in step 108, it can be concluded in consideration of the judgment result obtained in step 108 that the ignition delay time Δtd is longer than the upper-limit value Δtd2 determined in step 108. In this instance, therefore, the routine proceeds to step 124 and decreases the ignition delay time Δtd by performing a process for increasing the intake air amount of the diesel engine 10. As described earlier, while the diesel engine 10 is in the accelerator-off state, the opening of the throttle valve 26 is decreased with the opening of the EGR valve 32 increased. Thus, the greater part of the intake air flowing into a cylinder is an EGR gas that flows back through the EGR path 28. Therefore, the intake air amount can be increased by increasing the opening of the throttle valve 26. Consequently, step 124 is performed, more specifically, to increase the opening of the throttle valve 26.

After completion of step 124, the routine proceeds to step 126 and provides cetane number measurement fuel injection. The process performed in step 126 is the same as the process performed in step 102. Next, the routine performs step 128 so that the cylinder pressure sensor 38 detects the cylinder pressure (cylinder pressure history) in a cylinder into which cetane number measurement fuel is injected. As the intake air amount is increased by the process performed in step 124, the cylinder pressure detected in step 128 is higher than the cylinder pressure detected in step 104.

Next, the routine performs step 130 to calculate the ignition delay time Δtd from the cylinder pressure detected in step 128 by using the same method as in step 106. The ignition delay time Δtd calculated in step 130 is shorter than the ignition delay time Δtd calculated in step 106.

Next, the routine performs step 132 to make sure that the ignition delay time Δtd calculated in step 130 is between the upper-limit value Δtd1" and lower-limit value Δtd2" of the range over which the cetane number can be detected with high accuracy (Δtd1"≦Δtd≦Δtd2"). The upper-limit value Δtd1" and lower-limit value Δtd2" can be acquired by referencing a cetane number derivation map that is associated with an intake air amount obtained upon incremental correction (see FIG. 5).

Upon completion of step 132, the subroutine shown in FIG. 7 terminates, causing the routine to perform step 110, which is shown in FIG. 6. More specifically, step 110 is performed to derive a cetane number by substituting the ignition delay time Δtd calculated in step 130 into the cetane number derivation map that is associated with the intake air amount obtained upon incremental correction. Here, the cetane number can be determined with high accuracy because the ignition delay time Δtd is between the upper-limit value Δtd1" and lower-limit value Δtd2" of the range over which the gradient of the cetane number permits high-precision detection.

If, by any chance, the judgment result obtained in step 122 does not indicate that Δtd1'≦Δtd≦Δtd2', or the judgment result obtained in step 132 does not indicate that Δtd1"≦Δtd≦Δtd2", steps 112 and beyond may be performed again.

As described above, when it is difficult to accurately determine the cetane number with high accuracy because the ignition delay time is short and the gradient of a cetane number with respect to the ignition delay time is excessively steep, the present embodiment can detect the cetane number after lengthening the ignition delay time by correcting the control parameter for the diesel engine 10. Consequently, the cetane number can be detected with high accuracy even when a GTL fuel or other high-cetane fuel is used.

When, on the other hand, it is difficult to accurately determine the cetane number with high accuracy because the ignition delay time is long and the gradient of a cetane number with respect to the ignition delay time is excessively gentle, the present embodiment can detect the cetane number after shortening the ignition delay time by correcting the control parameter for the diesel engine 10. Consequently, the cetane number can be detected with high accuracy even when a cracked light oil or other low-cetane fuel is used.

During the use of a high-cetane fuel, which readily ignites, stable combustion occurs even when an increased EGR amount or retarded fuel injection timing is used as compared to a case where the cetane number of the employed fuel is standard. Since this enlarges the region of available operating conditions, operations can be conducted under more appropriate conditions from the viewpoint, for instance, of fuel efficiency and emission performance improvement. If, on the other hand, a low-cetane fuel is used, the resulting situation is the opposite to the above. The present invention makes it possible to accurately detect the cetane number of various fuels. Therefore, when a wide variety of fuels are used, the present invention can provide optimum engine control in accordance with the cetane number of each fuel.

When the ignition delay time is to be increased or decreased, the present embodiment corrects the intake air amount of the diesel engine 10. However, the present invention may increase or decrease the ignition delay time by correcting control parameter other than the intake air amount. Control parameter other than the intake air amount are, for example, a compression ratio (a mechanical compression ratio when the engine includes a compression ratio adjustment mechanism or an actual compression ratio when the engine includes an intake valve closing timing adjustment mechanism), an intake air temperature (when the engine includes a mechanism for adjusting the cooling rate of an EGR cooler or an inter-cooler), and an intake oxygen concentration (EGR rate).

Further, the present embodiment achieves cetane number detection by correcting the ignition delay time no matter whether the obtained judgment result indicates that the employed fuel has a high cetane number (Δtd<Δtd1) or a low-cetane number (Δtd>Δtd2). Alternatively, however, the present invention may detect a cetane number by correcting (increasing) the ignition delay time only when the obtained judgment result indicates that the employed fuel has a high cetane number.

In the first embodiment, which has been described above, the cylinder pressure sensor 38 corresponds to the "cylinder pressure detection means" according to the first aspect of the present invention. Further, the "ignition delay time calculation means" according to the first aspect of the present invention is implemented when the ECU 50 performs step 106; the "high-cetane fuel judgment means" according to the first aspect of the present invention is implemented when the ECU 50 performs steps 108 and 112; the "ignition delay time extension means" according to the first aspect of the present invention is implemented when the ECU 50 performs step 114; the "ignition delay time recalculation means" according to the first aspect of the present invention is implemented when the ECU 50 performs step 120; the "cetane number calculation means" according to the first aspect of the present invention is implemented when the ECU 50 performs step 110; the "low-cetane fuel judgment means" according to the third aspect of the present invention is implemented when the ECU 50 performs steps 108 and 112; the "ignition delay time reduction means" according to the third aspect of the present invention is implemented when the ECU 50 performs step 124; and the "ignition delay time recalculation means" according to the third aspect of the present invention is implemented when the ECU 50 performs steps 120 and 130.

The invention claimed is:

1. A fuel property detector for an internal combustion engine, comprising:
   cylinder pressure detection means for detecting cylinder pressure in an internal combustion engine;
   ignition delay time calculation means for calculating ignition delay time in accordance with the cylinder pressure;
   high-cetane fuel judgment means for judging in accordance with the calculated ignition delay time whether the cetane number of an employed fuel is high;
   ignition delay time extension means which, when the cetane number of the employed fuel is judged to be high, increases the ignition delay time by correcting a control parameter for the internal combustion engine;
   ignition delay time recalculation means for recalculating the ignition delay time in accordance with the cylinder pressure after the ignition delay time is increased by the ignition delay time extension means; and
   cetane number calculation means for calculating the cetane number of the employed fuel in accordance with the ignition delay time calculated by the ignition delay time recalculation means.

2. The fuel property detector according to claim 1, wherein the ignition delay time extension means corrects the control parameter so as to create operating conditions where the gradient of a cetane number with respect to the ignition delay time is gentler than a predetermined gradient.

3. The fuel property detector according to claim 1, further comprising:
   low-cetane fuel judgment means for judging in accordance with the ignition delay time calculated by the ignition delay time calculation means whether the cetane number of the employed fuel is low; and
   ignition delay time reduction means which, when the cetane number of the employed fuel is judged to be low, decreases the ignition delay time by correcting a control parameter for the internal combustion engine;

wherein the ignition delay time recalculation means calculates the ignition delay time in accordance with the cylinder pressure after the ignition delay time is decreased by the ignition delay time reduction means.

4. The fuel property detector according to claim 3, wherein the ignition delay time reduction means corrects the control parameter so that the combustion stability of the internal combustion engine is not lower than a reference value.

5. A fuel property detector for an internal combustion engine, comprising:

a cylinder pressure detection device for detecting cylinder pressure in an internal combustion engine;

an ignition delay time calculation device for calculating ignition delay time in accordance with the cylinder pressure;

a high-cetane fuel judgment device for judging in accordance with the calculated ignition delay time whether the cetane number of an employed fuel is high;

an ignition delay time extension device which, when the cetane number of the employed fuel is judged to be high, increases the ignition delay time by correcting a control parameter for the internal combustion engine;

an ignition delay time recalculation device for recalculating the ignition delay time in accordance with the cylinder pressure after the ignition delay time is increased by the ignition delay time extension device; and a cetane number calculation device for calculating the cetane number of the employed fuel in accordance with the ignition delay time calculated by the ignition delay time recalculation device.

6. The fuel property detector according to claim 5, wherein the ignition delay time extension device corrects the control parameter so as to create operating conditions where the gradient of a cetane number with respect to the ignition delay time is gentler than a predetermined gradient.

7. The fuel property detector according to claim 5, further comprising:

a low-cetane fuel judgment device for judging in accordance with the ignition delay time calculated by the ignition delay time calculation device whether the cetane number of the employed fuel is low; and an ignition delay time reduction device which, when the cetane number of the employed fuel is judged to be low, decreases the ignition delay time by correcting a control parameter for the internal combustion engine;

wherein the ignition delay time recalculation device calculates the ignition delay time in accordance with the cylinder pressure after the ignition delay time is decreased by the ignition delay time reduction device.

8. The fuel property detector according to claim 7, wherein the ignition delay time reduction device corrects the control parameter so that the combustion stability of the internal combustion engine is not lower than a reference value.

* * * * *